(12) United States Patent
Goodknight et al.

(10) Patent No.: US 7,542,234 B1
(45) Date of Patent: Jun. 2, 2009

(54) APPARATUS FOR IMPROVING PERFORMANCE OF A TAPE TRANSDUCER POSITIONING MECHANISM

(75) Inventors: Frank Goodknight, Niwot, CO (US); Darryl Wayne Yeakley, Erie, CO (US)

(73) Assignee: Storage Technology Corporation, Louisville, CO (US)

( * ) Notice: Subject to any disclaimer, the term of this patent is extended or adjusted under 35 U.S.C. 154(b) by 819 days.

(21) Appl. No.: 11/242,748

(22) Filed: Oct. 4, 2005

(51) Int. Cl.
*G11B 15/62* (2006.01)

(52) U.S. Cl. ............................... 360/130.21; 360/261.1

(58) Field of Classification Search ............ 360/130.21, 360/261.1, 261.2, 261.3, 265.1, 266.6, 267.6, 360/291

See application file for complete search history.

(56) References Cited

U.S. PATENT DOCUMENTS

| | | | | |
|---|---|---|---|---|
| 5,519,554 A | * | 5/1996 | Todd et al. ............... | 360/266.5 |
| 6,067,213 A | * | 5/2000 | Oldermann et al. .... | 360/130.21 |
| 6,078,478 A | * | 6/2000 | Gavit ....................... | 360/291.3 |
| 6,437,946 B2 | * | 8/2002 | Todd ....................... | 360/261.1 |
| 6,873,587 B2 | * | 3/2005 | Hashimoto ................ | 360/75 |
| 7,218,480 B1 | * | 5/2007 | Yeakley et al. ........... | 360/261.1 |

* cited by examiner

*Primary Examiner*—Angel A. Castro
(74) *Attorney, Agent, or Firm*—Brooks Kushman P.C.

(57) ABSTRACT

Apparatus is provided for a tape head actuator having a guide bearing preload mechanism, wherein the preload mechanism utilizes a magnet or magnets and an elongated steel member. These magnetic components interact to produce a force that is selectively directed to preload the guide bearings. In addition, the magnetic components produce a field used to shield the tape head from stray magnetic fields. In a useful embodiment of the invention, directed to apparatus for a tape transducer positioning mechanism, a carriage is disposed for movement along a path of travel relative to a support structure, to selectively position a tape transducer. One or more bearings are joined to the carriage, to support the carriage for movement along the path of travel. The apparatus further includes a first magnetic component joined to the support structure, and a second component joined to the carriage for cooperatively interacting with the first component, in order to produce a magnetic force that is transferred through the carriage to apply a preload force to each of the bearings.

20 Claims, 4 Drawing Sheets

APPARATUS FOR IMPROVING PERFORMANCE OF A TAPE TRANSDUCER POSITIONING MECHANISM

BACKGROUND OF THE INVENTION

1. Field of the Invention

The invention disclosed and claimed herein generally pertains to apparatus for improving performance of a tape transducer positioning mechanism, used in connection with a tape head designed to exchange data with magnetic tape media. More particularly, the invention pertains to apparatus of the above type wherein the tape transducer positioning mechanism is moved along a linear path of travel with respect to the tape, and the apparatus includes spaced apart magnetic components that produce a magnetic field orthogonal to the path of travel. Even more particularly, the invention pertains to apparatus of the above type wherein the orthogonal magnetic field is used to simultaneously perform different tasks, such as preloading the bearings of a transducer carrier, and at the same time suppressing a stray magnetic field proximate to the transducer.

2. Description of the Related Art

In a common data storage arrangement using magnetic tape, it is necessary to move a transducer such as a read/write head to different positions with respect to the tape. More particularly, the tape head, which is provided to selectively read data from and write data onto the tape, may need to be moved laterally across the width of the data storage tape. This may be necessary to place the head in operative relationship with any of two or more data bands or tracks positioned along the tape length.

In view of the above requirements, tape head actuators or positioning mechanisms have been developed, to move the tape head from one band to the other. Some of these actuators have two modes of operation, a first mode for moving the tape head between bands, and a second mode for maintaining alignment between the head and a particular track within a band.

In a common arrangement of the above type, the tape head is fixably mounted to an inner carriage. The inner carriage, in turn, is supported in an outer carriage for linear movement. A linear drive motor proximate to the inner and outer carriages is operable to linearly move the inner carriage, relative to the outer carriage, to position the tape head with respect to different tape bands. The outer carriage is mounted in a rigid frame by means of flexible brackets or the like. This enables the tape head and tape holding configuration to maintain alignment between the tape head and a particular tape track, notwithstanding vibrations caused by movements of the magnetic tape.

In the above tape head actuator arrangement, guide rails in conjunction with guide bearings or bushings are commonly used, to guide linear movements of the inner carriage and tape head. In order to minimize out-of-plane head movements when using this technique for head guiding, designs typically implement a method for preloading the guiding components, to remove play from the assembly. The most common method of preloading is by means of compression or leaf springs. However, these mechanisms tend to be plagued with reliability and performance problems. The performance problems typically result from such things as component fatigue, component wear, and unpredictable frictional forces at preload component interfaces. These are major contributors to poor assembly-to-assembly performance repeatability, and may eventually result in guiding failure.

A further problem encountered in tape head positioning actuators of the above type is the presence of stray magnetic fields. It will be readily apparent that controlling magnetic fields at the head/tape interface is essential, in order to accurately read and write data in tape drives. As a result, reducing external stray magnetic fields around the recording head is critical to proper read/write functionality. Stray fields around the head can potentially come from a number of sources, but most commonly are generated by linear drive or voice coil motors that are used to position the recording head relative to the tape. Placing high permeability materials between recording heads and voice coil motors (or other stray field generators) is a common technique utilized in an effort to shield heads from stray magnetic fields. However, in order to effectively protect the recording head from external stray fields, these shields must often be very large. In designs where space is limited and/or total allowable mass constraints have been imposed, these traditional shielding techniques can be difficult or impossible to implement.

In view of the above considerations, it would clearly be beneficial to provide a tape head positioning mechanism with an improved bearing preload arrangement, as well as with an alternate technique for reducing external stray magnetic fields around the recording head. It would be of further benefit if a single device or apparatus could be provided that would achieve both of these objectives.

SUMMARY OF THE INVENTION

The invention generally provides a tape head actuator having a guide bearing preload mechanism, wherein the preload mechanism utilizes a magnet (or magnets) and a steel (or magnetic) member. These two magnetic components interact to produce a force that is selectively directed to preload the guide bearings. In addition, the magnetic components produce a field that is used to shield the tape head from stray magnetic fields. More specifically, the shielding field has a strength and orientation that cancels a significant amount of the stray fields, thereby protecting the head. At the same time, the shielding field is made weak enough that it does not itself interfere with the read/write performance of the tape head. In one useful embodiment of the invention, directed to apparatus for a tape transducer positioning mechanism, a carriage is disposed for movement along a path of travel relative to a support structure, to selectively position a tape transducer. One or more bearings are joined to the carriage, to support the carriage for movement along the path of travel. The apparatus further includes a first magnetic component joined to the support structure, and a second component joined to the carriage for cooperatively interacting with the first component, in order to produce a magnetic force that is transferred through the carriage to apply a preload force to each of the bearings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
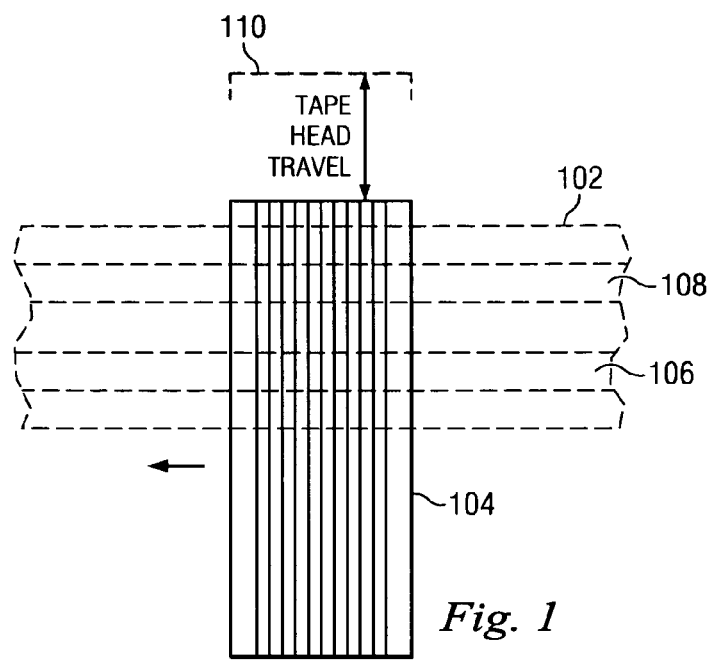
FIG. 1 is a schematic view showing a read/write tape head having multiple positions that may be used with an embodiment of the invention.

Referring to FIG. 1, there is shown a section of magnetic data storage tape 102, moving across a tape transducer such as a read/write head 104. The tape head 104 selectively reads data from, and writes data onto, the moving tape 102. More particularly, data is exchanged between tape head 104 and the band or track 106 included in tape 102, when tape head 104 is in a lower position as shown in FIG. 1. However, when tape head 104 is moved along a path of travel to position 110, the tape head reads data from or writes data onto a tape track 108.

Figure 2:
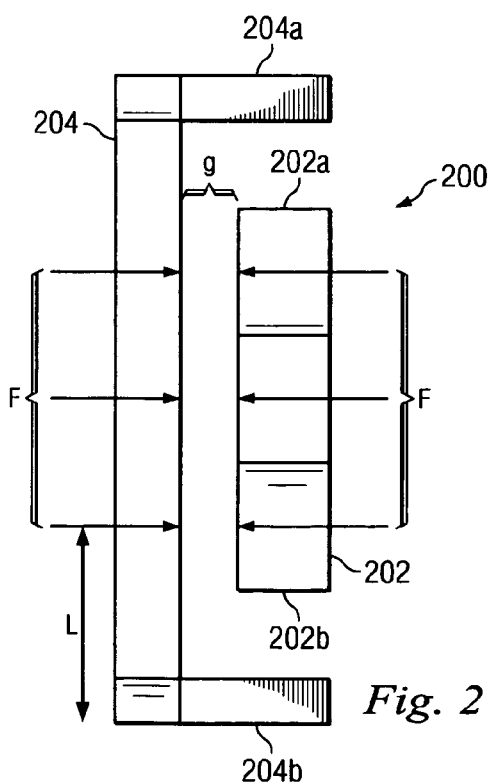
FIG. 2 is a side view showing magnetic components for an embodiment of the invention.

Referring to FIG. 2, there is shown a bearing preload mechanism 200 for an embodiment of the invention, comprising a permanent magnet 202 and an elongated steel member 204. Magnet 202 has flat or planar end surfaces 202a and 202b, in opposing relationship with one another. FIG. 2 shows steel member 204 having end elements 204a and 204b, likewise in opposing relationship with one another. As disclosed hereinafter in further detail, steel member 204 is mounted for movement with respect to magnet member 202, along a linear path of travel L. Also, components 202 and 204 are separated by a gap g. Accordingly, magnet 202 applies a magnetic force F to steel member 204, which acts to urge the two components toward one another. Thus, the gap g may vary very slightly. However, as likewise disclosed hereinafter, components 202 and 204 are respectively fixed to separate structures that act to keep them from being brought into contact by the magnetic force F. The gap g is therefore maintained between the two components. In some embodiments of the invention, linear movement of steel member 204 may bring steel end element 204a into abutting contact with planar magnet end surface 202a, or alternatively may bring steel end element 204b into abutting contact with planar magnet end surface 202b.

Figure 3:
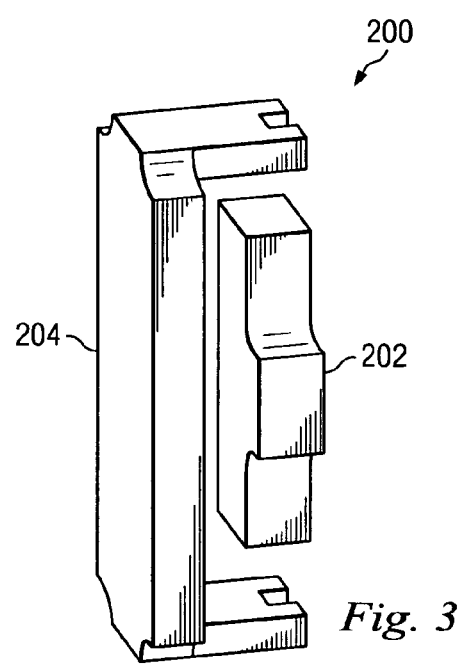
FIG. 3 is a perspective view of the components shown in FIG. 2.

FIG. 3 shows a perspective view of magnet 202 and elongated steel member 204 of the preloading mechanism 200.

Figure 4:
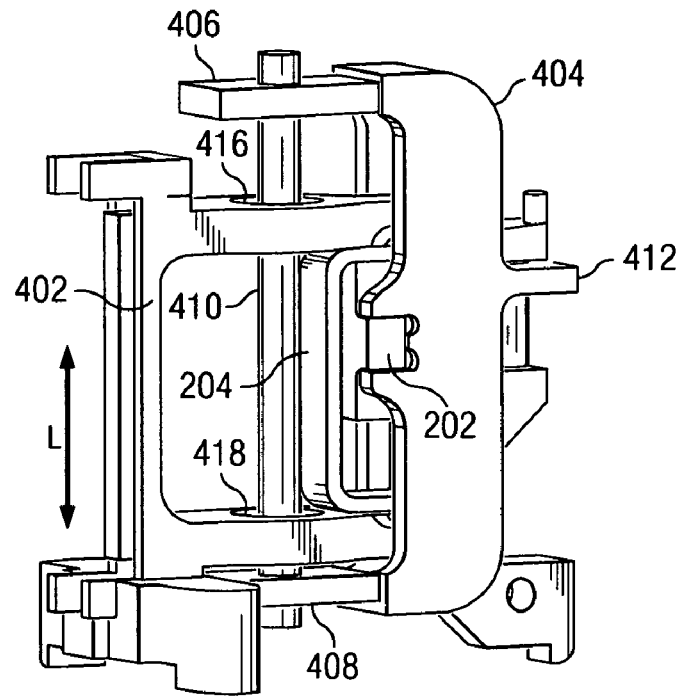
FIG. 4 is a perspective view showing a tape head actuator assembly provided with an embodiment of the invention.
Figure 5:
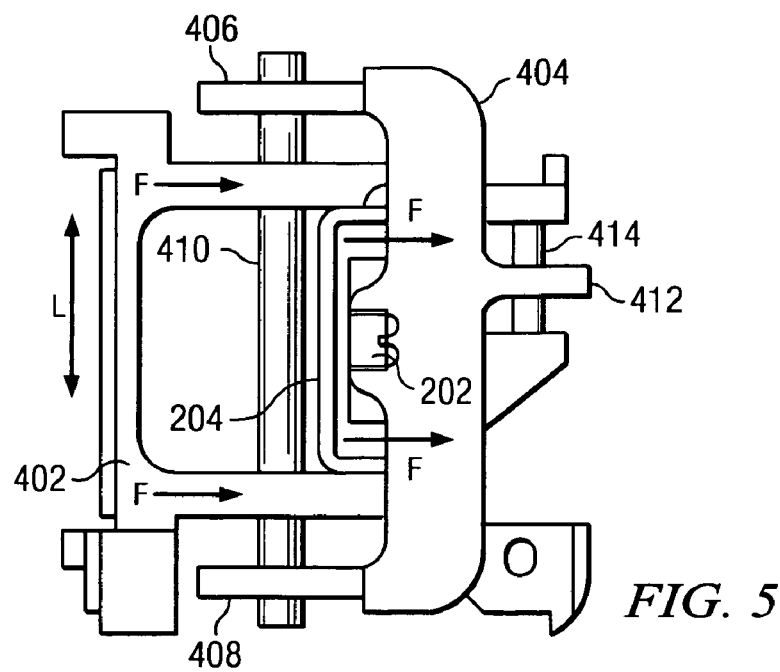
FIG. 5 is a side view of the assembly shown in FIG. 4.

Referring to FIGS. 4 and 5 together, there is shown an inner carriage 402 supported for limited linear movements L with respect to an outer carriage 404. This movement is upward or downward, as viewed in FIGS. 4 and 5. To guide this movement, outer carriage 404 is provided with brackets 406 and 408, that collectively support a guide rail 410. Outer carriage 404 is further provided with a bracket 412 that supports a guide rail 414. Inner carriage 402 is thus disposed to move along guide rails 410 and 414, between its upper and lower limits of travel. The upper and lower limits of travel are determined by both inner and outer carriages, not one or the other exclusively.

As described hereinafter in connection with FIG. 6, inner carriage 402 is designed to support and carry read/write tape head 104. Accordingly, the lower and upper limits of travel of inner carriage 404 are judiciously selected, in order to position tape head 104 to exchange data with either tape band 106 or 108, as inner carriage 402 is moved to its lower or upper limit, respectively.

As best shown by FIG. 4, guide bearings 416 and 418 are fixably mounted at opposing ends of carriage 402, for movement therewith. Bearing 416 and 418 usefully comprise ceramic slide bearings, but are not limited thereto. Bearings 416 and 418 engage guide rail 410, to closely guide movements of inner carriage 402 and tape head 104, and also to ensure that such movements are smooth and unimpeded. As discussed above, it is desired to preload the bearings 416 and 418, in order to minimize or prevent out-of-plane movements of tape head 104.

In accordance with an embodiment of the invention, and in order to apply a preload to bearings 416 and 418, FIGS. 4 and 5 show magnet 202 fixably joined to outer carriage 404. There is further shown steel member 204 fixably joined to inner carriage 402. Magnetic components 202 and 204 are positioned with respect to one another as discussed above, in connection with FIG. 2. Accordingly, they are separated by the gap g as steel member 204 is urged toward magnet 202 by the magnetic force F.

As best shown by FIG. 5, since steel member 204 is fixed to inner carriage 402, both member 204 and inner carriage 402 are urged by magnetic force F toward magnet 202, or rightward as viewed in FIG. 5. As the force F acts on inner carriage 402, it is transferred to bearings 416 and 418, which are trapped between inner carriage 402 and the guide rail 410. The transferred force serves to preload the bearings 416 and 418. Thus, the magnetic force generated between components 202 and 204 is applied to carriage 402 as a bearing preload force.

Figure 6:
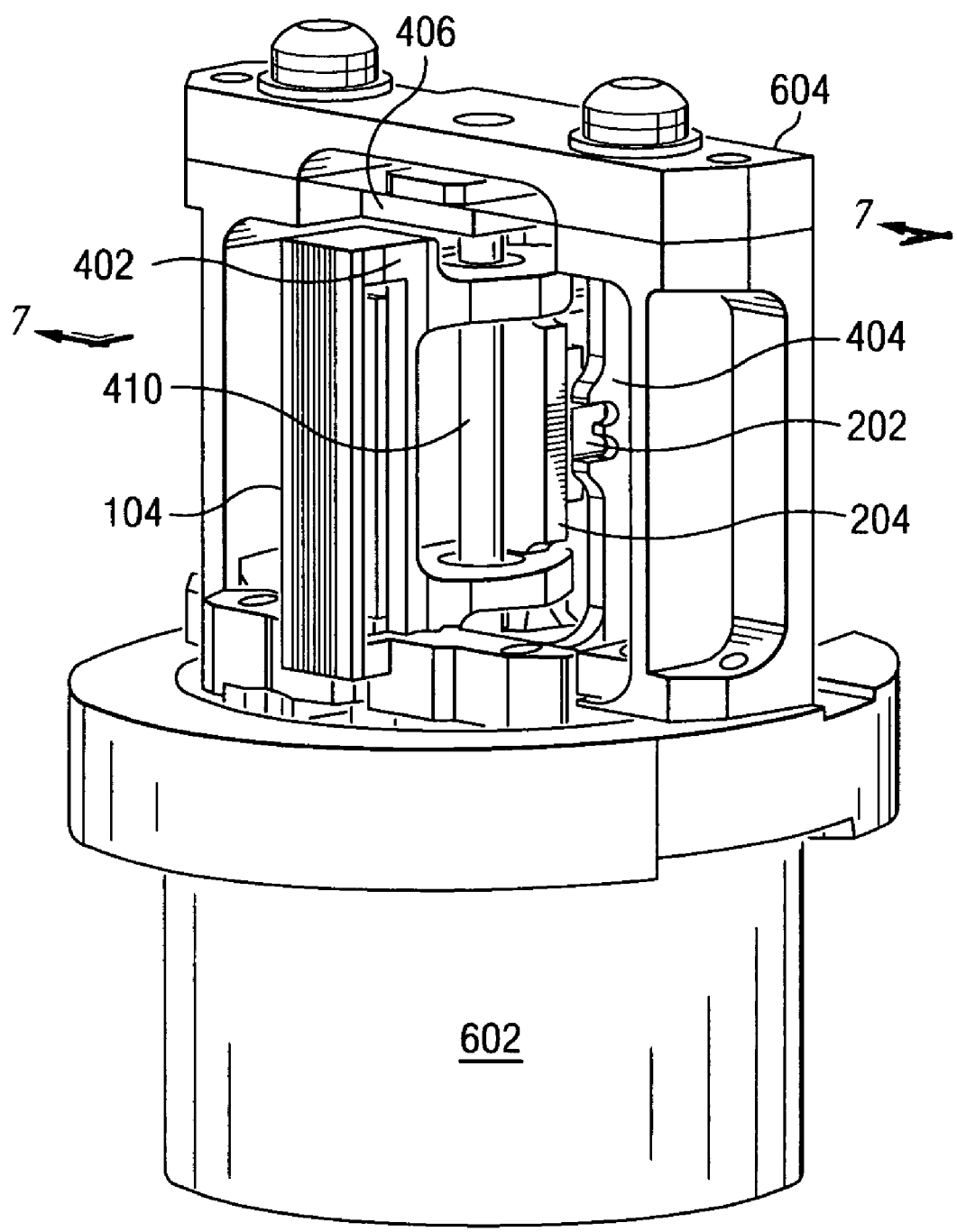
FIG. 6 is a perspective view showing the read/write head of FIG. 1 positioned upon the actuator assembly of FIG. 4.

Referring to FIG. 6, there is shown inner carriage 402, outer carriage 404 and magnetic components 202 and 204 of preload mechanism 200 supported upon a linear drive motor 602, and held in place thereon by means of the frame 604. FIG. 6 also shows read/write tape head 104 mounted on inner carriage 402. A linkage (not shown) is provided between motor 602 and inner carriage 402 to enable linear motor 602 to move inner carriage 402, and to thus move tape head 104 between its respective positions of operation, as desired.

When tape head 104 is moved into a selected one of its positions with respect to the magnetic tape, a detent mechanism is operable to lock inner carriage 402 to outer carriage 404. The head 104 is thus retained in the selected position. Typically, the locking action continues, until overcome by operation of motor 602 to reposition the inner carriage 402 and tape head 104. In one mode, magnetic components 202 and 204 are used for this purpose. For example, steel component 204 would be moved to bring one of its end elements into contact with the corresponding end surface of magnet 202. Magnet 202 would then firmly engage steel member 204. However, such mode is by no means necessary for the invention, and other detent arrangements could alternatively be used.

Referring to FIG. 6, there is shown outer carriage 404 supported in frame 604 by means of brackets such as bracket 406. Each of these brackets provides flexure between outer carriage 404 and frame 604, so that outer carriage 404 is allowed to move slightly with respect to frame 604. When inner carriage 402 is held in one its positions by the selected detent mechanism, the holding force is sufficient to move inner carriage 402 and tape head 104 in unison with outer carriage 404. This, in turn, allows tape head 104 to move slightly, to adapt to vibrations associated with movements of the data storage tape 102.

Figure 7:
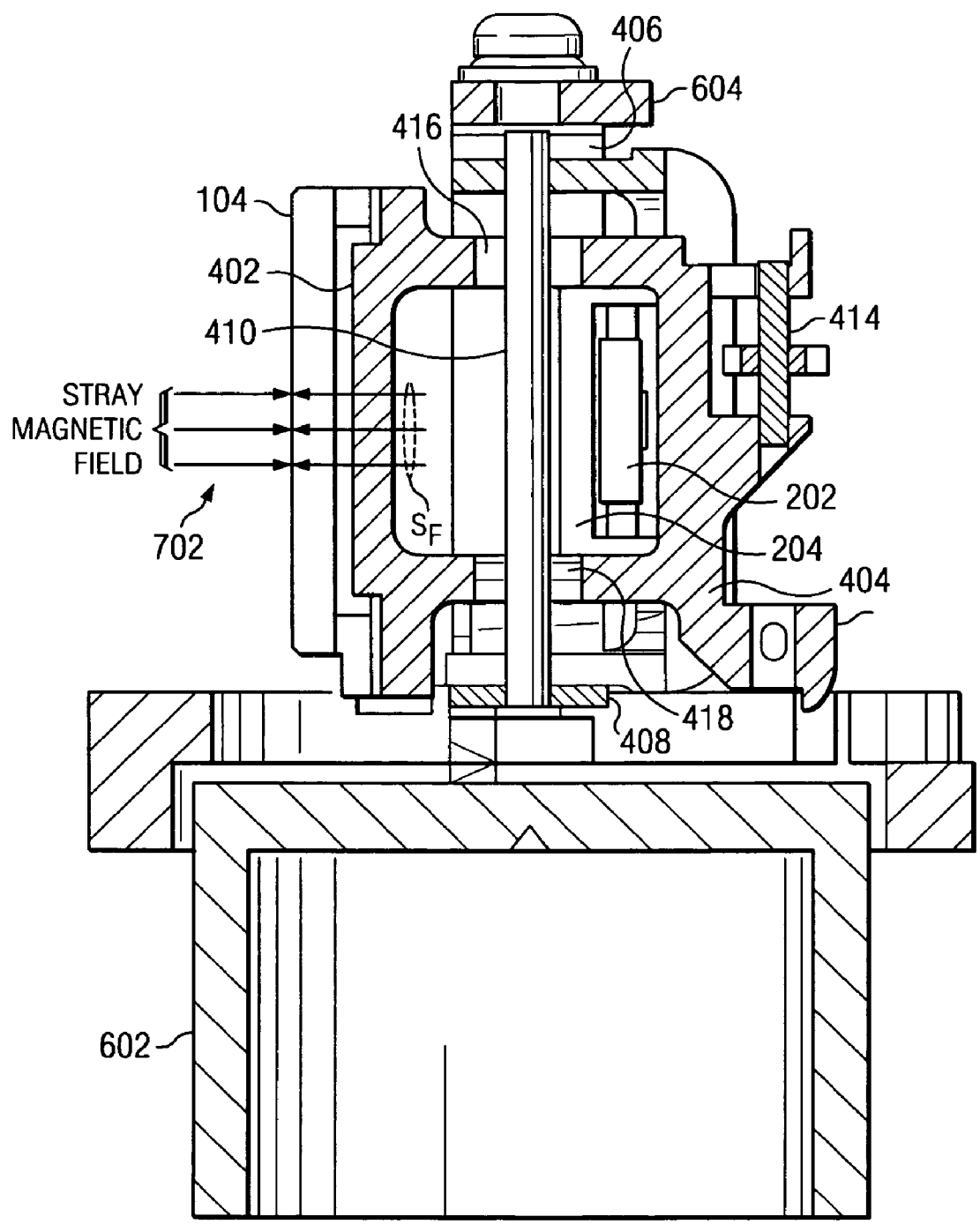
FIG. 7 is a sectional view taken along lines 7-7 of FIG. 6 for illustrating a further embodiment of the invention.

Referring to FIG. 7, there is shown a stray magnetic field 702 that is directed to or proximate to tape head 104. This field may be generated, for example, by operation of linear drive motor 602. As discussed above, the presence of this field would seriously interfere with data transfer operations of head 104. Accordingly, magnet 202 and member 204 are respectively configured to generate a shielding magnetic field $S_F$, which is oriented in a direction orthogonal to the path of travel of inner carriage 402. Thus, in addition to providing the bearing preload effect as described above, field $S_F$ is directed to suppress or cancel the stray field 702.

In a useful embodiment, magnet 202 is configured to generate a field $S_F$ that is sufficiently strong to cancel a significant amount of all stray fields that could affect operation of tape head 104. At the same time, the strength of field $S_F$ is sufficiently limited so that it will not by itself interfere with read/write operations at the tape head 104. Usefully, magnet 202 is designed so that the shielding magnetic field $S_F$ is primarily projected from the center or central region of magnet 202.

The description of the present invention has been presented for purposes of illustration and description, and is not intended to be exhaustive or limited to the invention in the form disclosed. Many modifications and variations will be apparent to those of ordinary skill in the art. For example, the positions of magnet 202 and steel member 204 could be reversed.

The embodiment was chosen and described in order to best explain the principles of the invention, the practical application, and to enable others of ordinary skill in the art to understand the invention for various embodiments with various modifications as are suited to the particular use contemplated.

What is claimed is:

1. Apparatus for a tape transducer positioning mechanism comprising:
   a support structure;
   a carriage disposed for movement along a path of travel relative to said support structure, to selectively position a tape transducer;
   one or more bearings joined to said carriage, to support said carriage for movement along said path of travel;
   a first magnetic component joined to said support structure; and
   a second magnetic component joined to said carriage for cooperatively interacting with said first component, to produce a magnetic force that is transferred through said carriage to apply a preload force to each of said bearings.

2. The apparatus of claim 1, wherein:
   said support structure includes a guide rail extending along a linear path of travel;
   said one or more bearings engage said guide rail to support said carriage for movement along said linear path of travel; and
   said magnetic force produced by said first and second magnetic components is oriented in a direction generally orthogonal to said linear path of travel.

3. The apparatus of claim 2, wherein:
   said first and second magnetic components are mounted in spaced apart relationship, and are urged toward one another by said magnetic force.

4. The apparatus of claim 3, wherein:
   a selected one of said magnetic components comprises a permanent magnet, and the other of said magnetic components comprises an elongated steel member.

5. The apparatus of claim 1, wherein:
   said first and second magnetic components are respectively configured to produce a shielding magnetic field that is directed to at least partially cancel a stray magnetic field tending to interfere with operation of said tape transducer.

6. The apparatus of claim 5, wherein:
   said tape transducer comprises a tape head disposed to exchange data with magnetic tape media; and
   said first and second magnetic components are judiciously configured to produce said shielding magnetic field with a strength that is sufficient to substantially cancel said stray magnetic field, and at the same time is too limited by itself to interfere with operation of said tape head.

7. The apparatus of claim 6, wherein:
   said stray magnetic field is generated by a linear drive motor located proximate to said carriage, for use in moving said carriage along its path of travel.

8. The apparatus of claim 5, wherein:
   one of said magnetic components comprises an elongated magnet configured to project said shielding magnetic field primarily from its central region.

9. A mechanism for positioning a tape transducer comprising:
   a support structure provided with a guide member;
   a carriage provided with bearings that support said carriage for movement along said guide member;
   an actuator coupled to move said carriage along said guide member, to selectively position said tape transducer with respect to specified magnetic data storage media;
   a first magnetic component joined to said support structure; and
   a second magnetic component joined to said carriage for cooperatively interacting with said first magnetic component, to produce a magnetic force that urges said carriage toward said support structure, and thereby applies a preload force to said bearings.

10. The mechanism of claim 9, wherein:
    said first component comprises a permanent magnet configured to generate a shielding magnetic field that is directed to at least partially cancel a stray magnetic field disposed to interfere with operation of said tape transducer, said shielding magnetic field having a strength lying between first and second limits.

11. The mechanism of claim 10, wherein:
    said first limit is selected to provide said shielding magnetic field with the capability to cancel said stray magnetic field, and said second limit is selected to prevent said shielding magnetic field from interfering with operation of said tape transducer.

12. The mechanism of claim 11, wherein:
    said magnet comprises an elongated magnet configured to project said shielding magnetic field primarily from its central region.

13. The mechanism of claim 10, wherein:
    said first and second components are brought into engagement with one another to retain said tape transducer in a particular position with respect to said media.

14. The mechanism of claim 10, wherein:
    said guide member comprises a linear guide rail, and said bearings comprise ceramic bearings.

15. A method for positioning a tape transducer comprising the steps of:
    providing a carriage with bearings to support said carriage for movement along a guide member fixed to a support structure;

moving said carriage along said guide member, to selectively position said tape transducer with respect to specified magnetic data storage media;

joining a first magnetic component to said support structure; and joining a second magnetic component to said carriage, to produce a magnetic force between said first and second magnetic components that urges said carriage toward said support structure, and thereby applies a preload force to said bearings.

16. The method of claim 15, wherein:

a shielding magnetic field is generated by means of said first component, said shielding magnetic field being directed to at least partially cancel a stray magnetic field disposed to interfere with operation of said tape transducer, said shielding magnetic field having a strength lying between first and second limits.

17. The method of claim 16, wherein:

said first limit is selected to provide said shielding magnetic field with the capability to cancel said stray magnetic field, and said second limit is selected to prevent said shielding magnetic field from interfering with operation of said tape transducer.

18. The method of claim 17, wherein:

said shielding magnetic field is projected primarily from a central region of said first component.

19. The method of claim 16, wherein:

said first and second components are brought into engagement with one another to retain said tape transducer in a particular position with respect to said media.

20. The method of claim 16, wherein:

said guide member comprises a linear guide rail, and said bearings comprise ceramic bearings.

* * * * *